(12) United States Patent
Chen et al.

(10) Patent No.: US 11,003,040 B2
(45) Date of Patent: May 11, 2021

(54) GRATING STRUCTURE AND DISPLAY DEVICE

(71) Applicant: BOE TECHNOLOGY GROUP CO., LTD., Beijing (CN)

(72) Inventors: Chenyu Chen, Beijing (CN); Zhongxiao Li, Beijing (CN); Xiaoehen Niu, Beijing (CN); Jinye Zhu, Beijing (CN); Wenqing Zhao, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/475,954

(22) PCT Filed: Dec. 17, 2018

(86) PCT No.: PCT/CN2018/121472
§ 371 (c)(1),
(2) Date: Jul. 3, 2019

(87) PCT Pub. No.: WO2019/165827
PCT Pub. Date: Sep. 6, 2019

(65) Prior Publication Data
US 2020/0012128 A1    Jan. 9, 2020

(30) Foreign Application Priority Data
Feb. 27, 2018    (CN) .......................... 201820278908.2

(51) Int. Cl.
*G02F 1/137*    (2006.01)
*G02B 30/27*    (2020.01)
(Continued)

(52) U.S. Cl.
CPC ............. *G02F 1/137* (2013.01); *G02B 30/27* (2020.01); *G02F 1/13394* (2013.01);
(Continued)

(58) Field of Classification Search
None
See application file for complete search history.

(56) References Cited

U.S. PATENT DOCUMENTS 9,632,325 B2 *  4/2017  Wu ........................ G02B 30/27
2014/0125893 A1 *  5/2014  Wu ..................... G02F 1/13394
                                                               349/15
(Continued)

FOREIGN PATENT DOCUMENTS

CN    202854459 U    1/2013
CN    102967965 A    3/2013
(Continued)

OTHER PUBLICATIONS

International Search Report and Written Opinion corresponding to PCT/CN2018/121472, dated Mar. 18, 2019 (11 pp to include English translation of Written Opinion).
(Continued)

*Primary Examiner* — Edward J Glick
*Assistant Examiner* — David Y Chung
(74) *Attorney, Agent, or Firm* — Myers Bigei, P.A.

(57) ABSTRACT

A grating structure includes slit regions (4) and light blocking regions (5) that are alternately distributed in a first direction. The slit regions (4) and the light blocking regions (5) extend in a second direction, and the first direction is perpendicular to the second direction. The grating structure further includes two electrode plates (10, 20) disposed oppositely, and a plurality of support columns (3) disposed between the two electrode plates (10, 20) and supporting them. At least two of the support columns (3) are spaced apart in the first direction are arranged in each of the slit regions (4).

12 Claims, 4 Drawing Sheets

(51) Int. Cl.
*G02F 1/1339* (2006.01)
*G02F 1/1343* (2006.01)
*G02F 1/155* (2006.01)
*G02F 1/161* (2006.01)
*G02F 1/163* (2006.01)

(52) U.S. Cl.
CPC .......... *G02F 1/13439* (2013.01); *G02F 1/155* (2013.01); *G02F 1/161* (2013.01); *G02F 1/163* (2013.01)

(56) References Cited

U.S. PATENT DOCUMENTS

| | | | |
|---|---|---|---|
| 2016/0018662 A1 | 1/2016 | Wang | |
| 2016/0253013 A1* | 9/2016 | Yang | ................ G02F 1/133528 345/173 |
| 2016/0282808 A1 | 9/2016 | Smalley | |

FOREIGN PATENT DOCUMENTS

| | | |
|---|---|---|
| CN | 202854459 U | 4/2013 |
| CN | 103809283 A | 5/2014 |
| CN | 104122700 A | 10/2014 |
| CN | 207882478 U | 9/2018 |

OTHER PUBLICATIONS

International Search Report and Written Opinion corresponding to PCT/CN2018/121472, dated Mar. 15, 2019 (10 pp to include English translation of Written Opinion).

* cited by examiner

GRATING STRUCTURE AND DISPLAY DEVICE

CROSS REFERENCE TO RELATED APPLICATIONS

The present application is a 35 U.S.C. 371 national stage application of PCT International Application No. PCT/CN2018/121472, filed on Dec. 17, 2018, which claims the benefit of Chinese Patent Application No. 201820278908.2, filed on Feb. 27, 2018, the entire disclosures of which are incorporated herein by reference.

TECHNICAL FIELD

The present disclosure relates to the technical field of displays, and more particularly to a grating structure and a display device.

BACKGROUND

One implementation of naked-eye 3D technology is the light barrier technology. According to the light barrier technology, a grating is disposed on the light-emitting side of a display panel, and enables the left eye and the right eye of a person to see different views by means of the light blocking and transmission of the grating, thereby realizing a 3D stereoscopic effect.

The grating generally comprises two transparent electrode plates, and a dielectric layer (e.g., a liquid crystal layer) disposed between the two electrode plates. In such a case, light blocking regions and slit regions may be formed on the entire grating by changing the voltage applied to different regions of the two electrode plates. At this time, a plurality of support columns is needed between the two electrode plates to support a space formed for accommodating the dielectric layer.

However, when the above-described grating is used, there is a large difference in the number of support columns that human eyes see from different angles. Due to this difference in the number of support columns seen at different viewing angles, there will also be a huge difference in the brightness of the display screen perceived by the human eyes at different positions, thereby forming a periodically changing moiré pattern.

It should be explained that the information presented in the above Background section is only for facilitating the understanding of the background of the present disclosure, and thus may include information that does not constitute relevant technologies that are well-known to those ordinarily skilled in the art.

SUMMARY

According to one aspect of the present disclosure, there is provided a grating structure. The grating structure comprises slit regions and light blocking regions that are alternately distributed in a first direction, wherein the slit regions and the light blocking regions extend in a second direction, and the first direction is perpendicular to the second direction. In addition, the grating structure further comprises: two electrode plates disposed oppositely; and a plurality of support columns disposed between the two electrode plates and supporting them, wherein at least two of the support columns spaced apart in the first direction are arranged in each of the slit regions.

According to some exemplary embodiments of the present disclosure, in the above-mentioned grating structure, each of the slit regions is further provided with a plurality of lines of support columns extending in the second direction, and two adjacent lines of support columns are spaced apart in the first direction.

According to some exemplary embodiments of the present disclosure, in the grating structure as mentioned above, the two adjacent lines of support columns are spaced apart equidistantly in the first direction.

According to some exemplary embodiments of the present disclosure, in the grating structure as mentioned above, the two adjacent lines of support columns are further staggered in the second direction.

According to some exemplary embodiments of the present disclosure, in the grating structure as mentioned above, the plurality of lines of support columns comprises two lines of support columns.

According to some exemplary embodiments of the present disclosure, the grating structure as mentioned above further comprises a dielectric layer disposed between the two electrode plates, wherein the dielectric layer is configured to form the slit regions and the light blocking regions when applying different voltages to different regions of the two electrode plates.

According to some exemplary embodiments of the present disclosure, in the grating structure as mentioned above, the slit regions and the light blocking regions are interconvertible.

According to some exemplary embodiments of the present disclosure, in the grating structure as mentioned above, the dielectric layer comprises a liquid crystal layer.

According to some exemplary embodiments of the present disclosure, in the grating structure as mentioned above, the dielectric layer comprises an electrochromic layer.

According to another aspect of the present disclosure, there is also provided a display device. The display device comprises a display panel; and a grating structure according to any one of the previously-described exemplary embodiments, wherein the grating structure is disposed at a light-emitting side of the display panel.

It should be understood that the above general description and following detailed description are only exemplary and illustrative, and cannot impose any limitation to the present disclosure.

BRIEF DESCRIPTION OF DRAWINGS

The drawings herein are incorporated into the specification and form a part thereof. The drawings illustrate the exemplary embodiments of the present disclosure and are used, together with the specification, for explaining the principle of the present disclosure. Apparently, the following drawings are only related to some exemplary embodiments of the present disclosure. As far as those ordinarily skilled in the art are concerned, other embodiments may be derived from these drawings without making any inventive labor.

DETAILED DESCRIPTION

Figure 1:
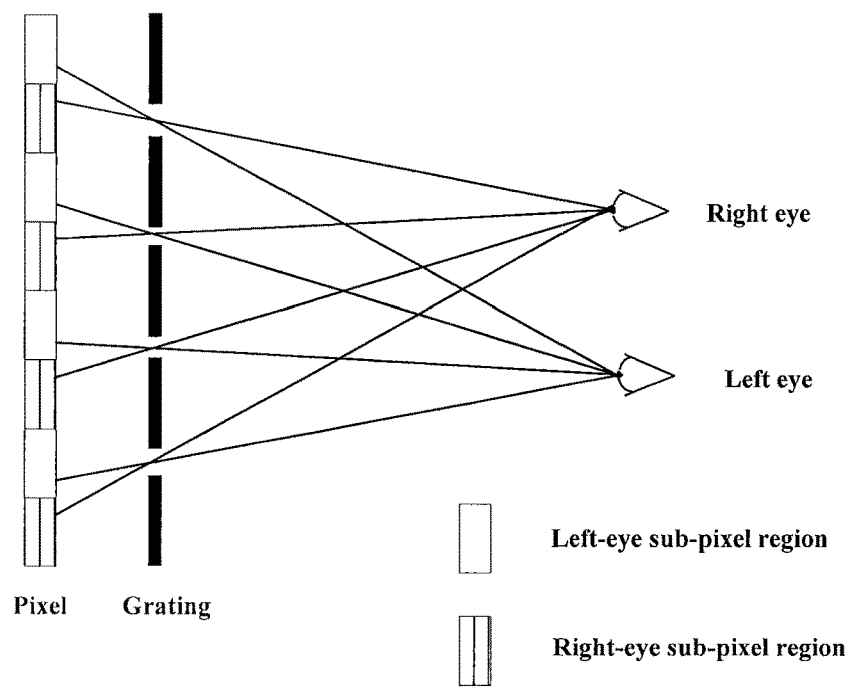
FIG. 1 is a schematic diagram showing how to realize a naked-eye 3D display effect by a light barrier method according to a relevant technology.

Exemplary embodiments will now be described more comprehensively with reference to the drawings. However, the exemplary embodiments may be implemented in a variety of forms, and shall not be understood as being limited to the examples described herein. Instead, these exemplary embodiments are provided to make the present disclosure more comprehensive and complete, and convey the conceptions of the exemplary embodiments fully to those skilled in the art. Identical reference numerals in the drawings represent identical or similar structures, and thereby the detailed description thereof will not be reiterated.

Although the relative terms such as "upper" and "lower" are used in the specification to describe the relative relationship of one component to another component in the drawings, these terms are used in the present specification for convenience only, for example, a direction according to the example in the drawing. It will be understood that if the device in the drawing is turned upside down, the "upper" component will become the "lower" component. Other relative terms, such as "high", "low", "top", "bottom", "left", "right", also have similar meanings. When a structure is "on" another structure, it may indicate that a structure is integrally formed with other structure, or that a structure is "directly" disposed on other structure, or that a structure is "indirectly" disposed on other structure through another structure.

The terms "a", "an", and "the" are used to mean the presence of one or more elements, components, etc. The terms "comprising/including" and "having" are used to mean inclusion in an open-ended manner, and indicate that there may be additional elements, components, etc., in addition to the enumerated elements, components, etc.

With reference to FIG. 1, it schematically illustrates a schematic diagram showing how to realize naked-eye 3D display by a light barrier method according to a relevant technology. According to the light-barrier type naked-eye 3D display technology, a grating is disposed between the pixel region of a display device and human eyes. The grating comprises light blocking regions (the black areas in the drawing) and slit regions (the transparent areas in the drawing). The light blocking regions of the grating may partially shield the display of the pixel region, such that the picture information of the left-eye sub-pixel region in the pixel region is projected onto a person's left eye through the slit regions of the grating, and the picture information of the right-eye sub-pixel region in the pixel region is projected onto the person's right eye through the slit regions of the grating. The person's brain combines and processes the different picture information seen by the left and right eyes to obtain a stereoscopic visual effect.

Figure 2:
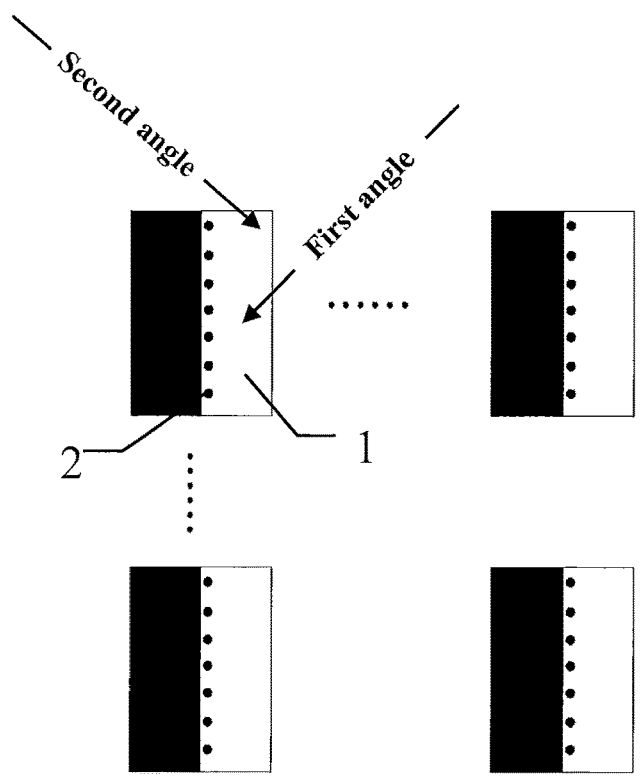
FIG. 2 is a top view showing the distribution of support columns in a naked-eye 3D display device according to a relevant technology.
Figure 3:
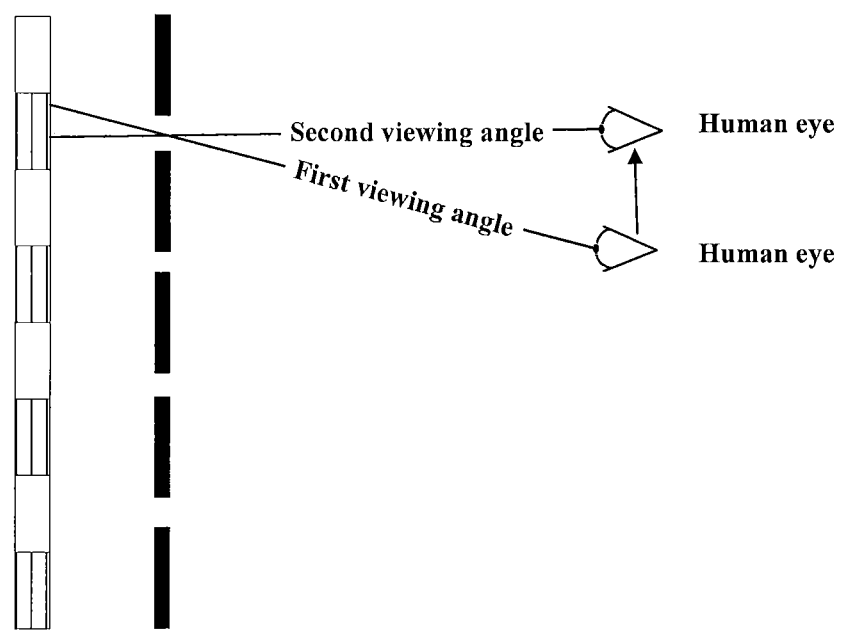
FIG. 3 is a schematic view showing the generation of a moiré pattern according a relevant technology.

Further with reference to FIG. 2, it schematically illustrates a top view showing the distribution of support columns in a naked-eye 3D display device according to a relevant technology. As shown in FIG. 2, the support columns in the slit region 1 are linearly distributed in a single row in the extending direction of the slit region 1. However, there is a great difference in the number of support columns when viewed by human eyes from different angles. For instance, as shown in FIG. 1, one row of the support columns may be seen by human eyes from a first angle; whereas no support columns may be seen by human eyes from a second angle. Due to the difference in the number of support columns seen from different viewing angles, there will also be a huge difference in the brightness of the display screen perceived by the human eyes at different positions, thereby forming a periodically changing moiré pattern (e.g., as seen in FIG. 3).

As known from the above description, since there is a certain distance between the grating and the pixel region in FIG. 2, human eyes, when moving, e.g., up and down, to obtain the picture information of the same pixel, may see varying numbers of the support columns. With reference to FIG. 3, it schematically illustrates a schematic diagram showing the generation of a moiré pattern according a relevant technology. For instance, as shown in FIG. 3, since there is a certain distance between the grating and the pixel region, human eyes need to move in the direction indicated by the arrow so as to obtain the picture information of the same pixel from different viewing angles. Under such circumstances, when human eyes moved from the first viewing angle (e.g., the same viewing angle as the first viewing angle in FIG. 1) to the second viewing angle (e.g., the same viewing angle as the second viewing angle in FIG. 1), the number of the support columns seen thereby may vary. Then, since the support column has a light blocking effect, the picture information of the same pixel will have a varying degree of brightness during the movement of human eyes, thereby generating a periodically changing moiré pattern.

Figure 4A:
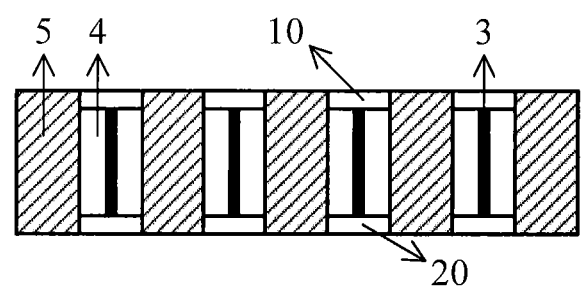
FIGS. 4(a) and 4(b) are respectively schematic cross-sectional and schematic top views of a grating structure according to an exemplary embodiment of the present disclosure.
Figure 4B:
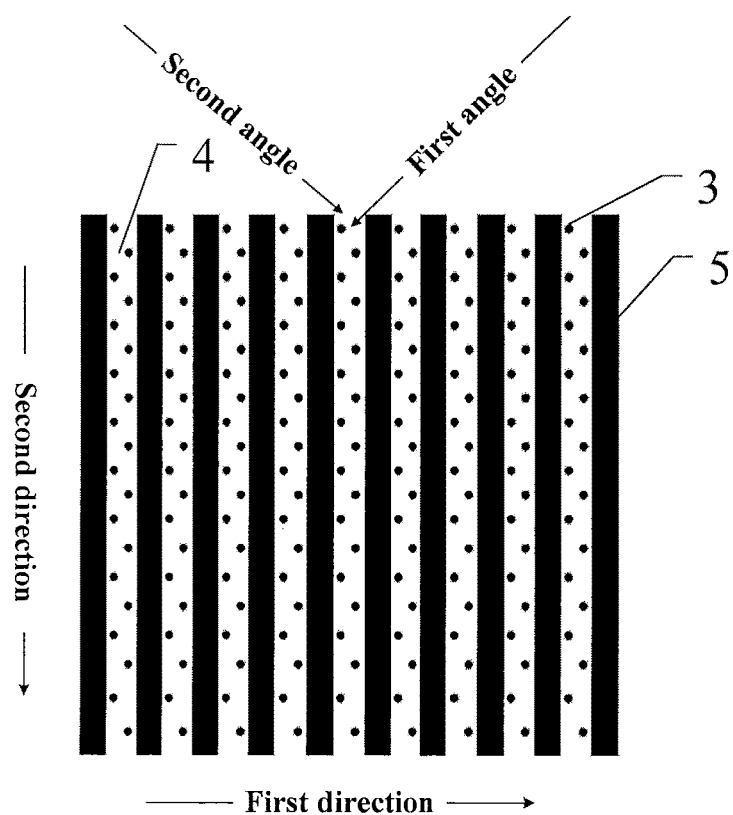

On this basis, the present disclosure provides a grating structure in an exemplary embodiment. As shown in FIGS. 4(a) and 4(b), it schematically illustrates a structural top view of the grating structure according to an exemplary embodiment of the present disclosure. The grating structure comprises two electrode plates 10, 20 oppositely disclosed and a plurality of support columns 3. In addition, the grating structure further comprises slit regions 4 and light blocking regions 5 that are alternately distributed in a first direction, wherein the slit region 4 and the light blocking region 5 extend in a second direction, and the first direction is perpendicular to the second direction. Furthermore, the plurality of support columns 3 is distributed between the two electrode plates 10, 20 for supporting the two electrode plates 10, 20. In addition, each of the slit regions 4 is provided with at least two of the support columns 3 spaced apart in the first direction.

Figure 5:
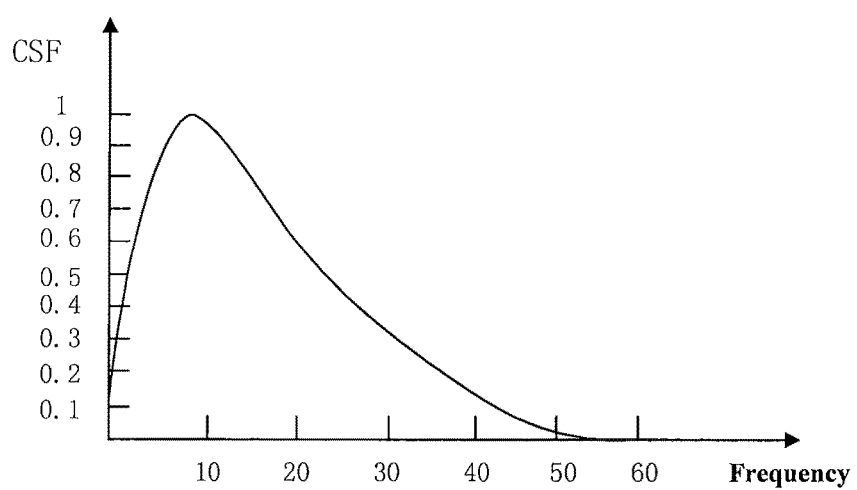
FIG. 5 is a view showing the contrast sensitivity function of the human eye.

As shown in FIG. 5, it schematically illustrates the contrast sensitivity function of the human eye. The contrast sensitivity function indicates the sensitivity of the human eye to image information under different frequencies. The higher the value of the contrast sensitivity function is, the more sensitive the human eye is at the changing frequency of the image. If the frequency of a visual stimulus is too high, the human eye cannot recognize the stimulus mode.

Meanwhile, studies show that the absolute value of a moiré pattern has a relatively great impact on whether the human eye can see the moiré pattern. For instance, if the absolute value of the moiré pattern is less than 1.1, it is difficult for the human eye to see the moiré pattern. According to a relevant technology, the absolute value of the moiré pattern is P/(B−S*X). Comparatively speaking, in an exemplary embodiment of the present disclosure, the absolute value of the moiré pattern is (B−S*X+K)/(B−S*X), wherein K is very small. Thus, in an exemplary embodiment of the present disclosure, the absolute value of the moiré pattern is almost equal to 1. This means that it is really hard for the human eye to see an obvious moiré pattern. In the above equation, B is the width of the light blocking region in the first direction, P is the width of the slit region in the first direction, S is the spacing between adjacent two support columns in the first direction, and X is the transmittance of the support column.

The grating structure provided by the present disclosure reduces the variation of the number of support columns seen by the human eye at different viewing angles, and meanwhile increases the changing frequency of the number of support columns, thereby alleviating the periodic change of the moiré pattern caused by the change of the viewing angle. For instance, as shown in FIGS. 4(a) and 4(b), the human eye may see a row of support columns from the first viewing angle, the human eye may also see a row of support columns from the second viewing angle, and the human eye when perpendicular to the grating may see two rows of support columns. It can thus be seen that the change of the number of support columns seen by the human eye from different viewing angles is 1 row, two rows and 1 row. In contrast, in a conventional solution, the change of the number of support columns seen by the human eye from different viewing angles is 1 row and 0 row. Obviously, the present disclosure not only reduces the variation of the number of support columns seen by the human eye at different viewing angles, and meanwhile increases the changing frequency of the number of support columns. At such a changing frequency of the number of support columns, the contrast sensitivity function is relatively low. Thus, the grating structure may alleviate the periodic change of the moiré pattern caused by the change of the viewing angle. In addition, the present disclosure also decreases the absolute value of the moiré pattern, such that the absolute value of the moiré pattern is close to 1. At this absolute value of the moiré pattern, it is very difficult for the human eye to see an obvious moiré pattern.

The present disclosure provides a grating structure. In the grating structure, each of the slit regions is provided with at least two of the support columns spaced apart in the first direction. On the one hand, the grating structure may alleviate the periodic change of the moiré pattern caused by the change of the viewing angle; and on the other hand, the grating structure is structurally simple and cost-effective.

In an exemplary embodiment, the light blocking regions 5 and the slit regions 4 may be formed by the following manners: the two electrode plates are divided into a plurality of mutually insulated strip-shaped sub-electrode plate sets in the first direction, wherein the sub-electrode plates sets may be mutually connected, and a dielectric layer may be filled between the two electrode plates. When different voltages are input between two sub-electrode plates of each sub-electrode plate set, the dielectric layer will form the slit regions 4 and the light blocking regions 5 alternately distributed in the first direction under the action of different voltages. It should be understood that in other exemplary embodiments, the light blocking regions 5 and the slit regions 4 may be formed by any other suitable manner, and all these manners shall fall within the scope of protection of the present disclosure.

In an exemplary embodiment, the dielectric layer may be liquid crystal layer. Typically, liquid crystal molecules have different arrangements at different voltages, so as to enable the light passing therethrough to have different polarization directions. By combining the liquid crystal layer with polarizing sheets located at both sides thereof, there may be formed light transmitting regions or light blocking regions, i.e., the slit regions and the light blocking regions in the current exemplary embodiment. Such an implementation process is substantially the same as the principle of the liquid crystal display, which will not be reiterated herein. In other exemplary embodiments, the dielectric layer may also be an electrochromic layer, wherein the electrochromic layer may display different colors at different voltages. When the sub-electrode plate set is required to be located in the light blocking region, the electrochromic layer may be made black. Similarly, when the sub-electrode plate set is required to be located in the slit region, the electrochromic layer may be made transparent. In an exemplary embodiment, an electrochromic material may be selected from the group consisting of polythiophenes and derivatives thereof, viologen, tetrathiafulvalene, metallophthalocyanine compounds, and the like.

Figure 6:
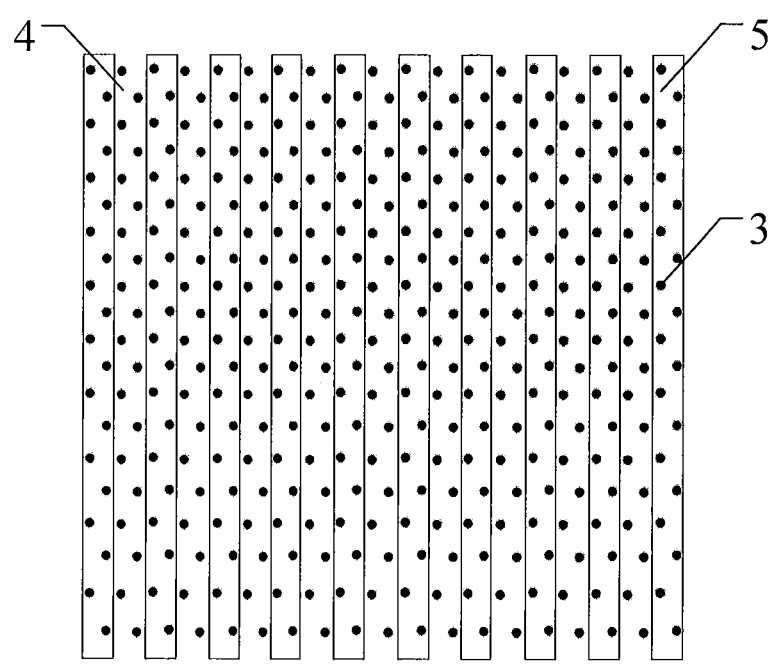
FIG. 6 is a schematic top view showing the distribution of support columns in the grating structure according to an exemplary embodiment of the present disclosure.

It should be explained that in a naked-eye 3D display, the light blocking regions 5 and the slit regions 4 of the grating may be interconvertible at any time as required. That is, a light blocking region may be transformed into a slit region, and a slit region may be transformed into a light blocking region, at any time as required, and vice versa. Thus, as shown in FIG. 6, it schematically illustrates a top view is showing the distribution of support columns in the grating structure according to an exemplary embodiment of the present disclosure. In the exemplary embodiment, at least two of the support columns in the same light blocking region 5 are spaced apart in the first direction. When the light blocking region 5 and the slit region 4 are transformed into each other respectively, the grating structure provided by the exemplary embodiment still does not generate the moiré pattern.

In an exemplary embodiment, as shown in FIGS. 4(a) and 4(b), the support columns 3 in the same slit region 4 comprise a plurality of lines of support columns distributed in the second direction. It should be explained that the more the lines of support columns, the faster the changing frequency of the moiré pattern seen by the human eye, and the lower the contrast sensitivity function, so that the human eye is less likely to perceive the moiré pattern. It should be understood that in other exemplary embodiments, the support column 3 in each slit region 4 may be designed in any other suitable manner, so that at least two support columns are spaced apart in the first direction, and all these manner shall fall within the scope of protection of the present disclosure.

When a plurality of support columns is located at the same viewing angle, an obvious dark area will be formed at the viewing angle, thereby affecting the visual effect. In an exemplary embodiment, as shown in FIGS. 4(a) and 4(b), the plurality of lines of support columns is staggered in the second direction, i.e., there is only one support column distributed on the same row. Under such circumstances, when the human eye moves horizontally, there will not occur the case where a plurality of support columns is located at the same viewing angle. Thus, it is possible to avoid the formation of an obvious dark area and increase the display effect.

When the plurality of lines of support columns are unevenly distributed in the first direction, the image will have an obvious dark-and-light change in brightness in the second direction, thereby affect the display effect. In an exemplary embodiment, the plurality of lines of support columns is spaced apart equidistantly in the first direction.

Such an arrangement may prevent the image from an obvious dark-and-light change in brightness in the second direction. To be specific, the spacing of the support columns in the first direction may be set according to the number of lines of support columns and the width of the slit region, which will not be specially limited herein.

In an exemplary embodiment, the support columns 3 located in the same slit region 4 comprise a plurality of lines of support columns distributed in the second direction, e.g., two lines of support columns. The two-line design of support columns is structurally simple, and the two lines of support columns may be respectively located at both sides of the slit region, such that the support columns when viewed from any viewing angle are never simultaneously located at the same viewing angle, thereby enhancing the display effect. Meanwhile, the two-line design of support columns may already obtain a smaller contrast sensitivity function.

According to another aspect of the present disclosure, there is also provided a display device in an exemplary embodiment. To be specific, the display device comprises a display panel and a grating structure as stated above, wherein the grating structure is located at a light-emitting side of the display panel.

It should be explained that the display device has the same technical features and working principle as those of the grating structure. Since the above contents have made a detailed explanation thereof, they will not be reiterated herein.

In consideration of the specification and after implementing the contents disclosed herein, those skilled in the art will readily envisage other embodiments of the present disclosure. This application is intended to cover any variation, use or adaptive changes of the present disclosure. These variations, uses or adaptive changes follow the general principles of the present disclosure and include common knowledge and conventional technical means in the art that are not disclosed herein. The specification and examples are only regarded as exemplary, and the real scope and spirit of the present disclosure are only indicated by the claims.

It shall be understood that the present disclosure is not limited to the precise structures that have been described above and shown in the drawings, and may have various variations and modifications without departing from the scope thereof. The scope of the present disclosure is only limited by the appended claims

What is claimed is:

1. A grating structure, comprising slit regions and light blocking regions that are alternately distributed in a first direction, wherein the slit regions and the light blocking regions extend in a second direction, wherein the first direction is perpendicular to the second direction, and wherein the grating structure further comprises:
    two electrode plates disposed oppositely; and
    a plurality of support columns between the two electrode plates,
    wherein the plurality of support columns support the two electrode plates,
    wherein the plurality of support columns comprise a plurality of lines of support columns provided in each of the slit regions and extending in the second direction,
    wherein two adjacent lines of the plurality of lines of support columns are spaced apart in the first direction and staggered in the second direction.

2. The grating structure according to claim 1, wherein the two adjacent lines of support columns are spaced apart equidistantly in the first direction.

3. The grating structure according to claim 1, wherein the plurality of lines of support columns comprises two lines of support columns.

4. The grating structure according to claim 1, further comprising:
    a dielectric layer between the two electrode plates,
    wherein the dielectric layer is configured to form the slit regions and the light blocking regions when applying different voltages to different regions of the two electrode plates.

5. The grating structure according to claim 4, wherein the slit regions and the light blocking regions are interconvertible.

6. The grating structure according to claim 4, wherein the dielectric layer comprises a liquid crystal layer.

7. The grating structure according to claim 4, wherein the dielectric layer comprises an electrochromic layer.

8. A display device, comprising:
    a display panel; and
    the grating structure according to claim 1,
    wherein the grating structure is at a light-emitting side of the display panel.

9. The grating structure according to claim 1, further comprising:
    a dielectric layer between the two electrode plates,
    wherein the dielectric layer is configured to form the slit regions and the light blocking regions when applying different voltages to different regions of the two electrode plates.

10. The grating structure according to claim 2, further comprising:
    a dielectric layer between the two electrode plates,
    wherein the dielectric layer is configured to form the slit regions and the light blocking regions when applying different voltages to different regions of the two electrode plates.

11. The grating structure according to claim 3, further comprising:
    a dielectric layer between the two electrode plates,
    wherein the dielectric layer is configured to form the slit regions and the light blocking regions when applying different voltages to different regions of the two electrode plates.

12. A display device, comprising:
    a display panel; and
    the grating structure according to claim 4,
    wherein the grating structure is at a light-emitting side of the display panel.

* * * * *